Feb. 10, 1953    W. J. WILLIAMS ET AL    2,628,134
PROTECTIVE COLLAR FOR DRILL PIPES
Filed July 17, 1948    2 SHEETS—SHEET 1

WILLIAM J. WILLIAMS,
JAMES W. E. HANES,
INVENTORS.

BY *William E Hall*
ATTORNEY.

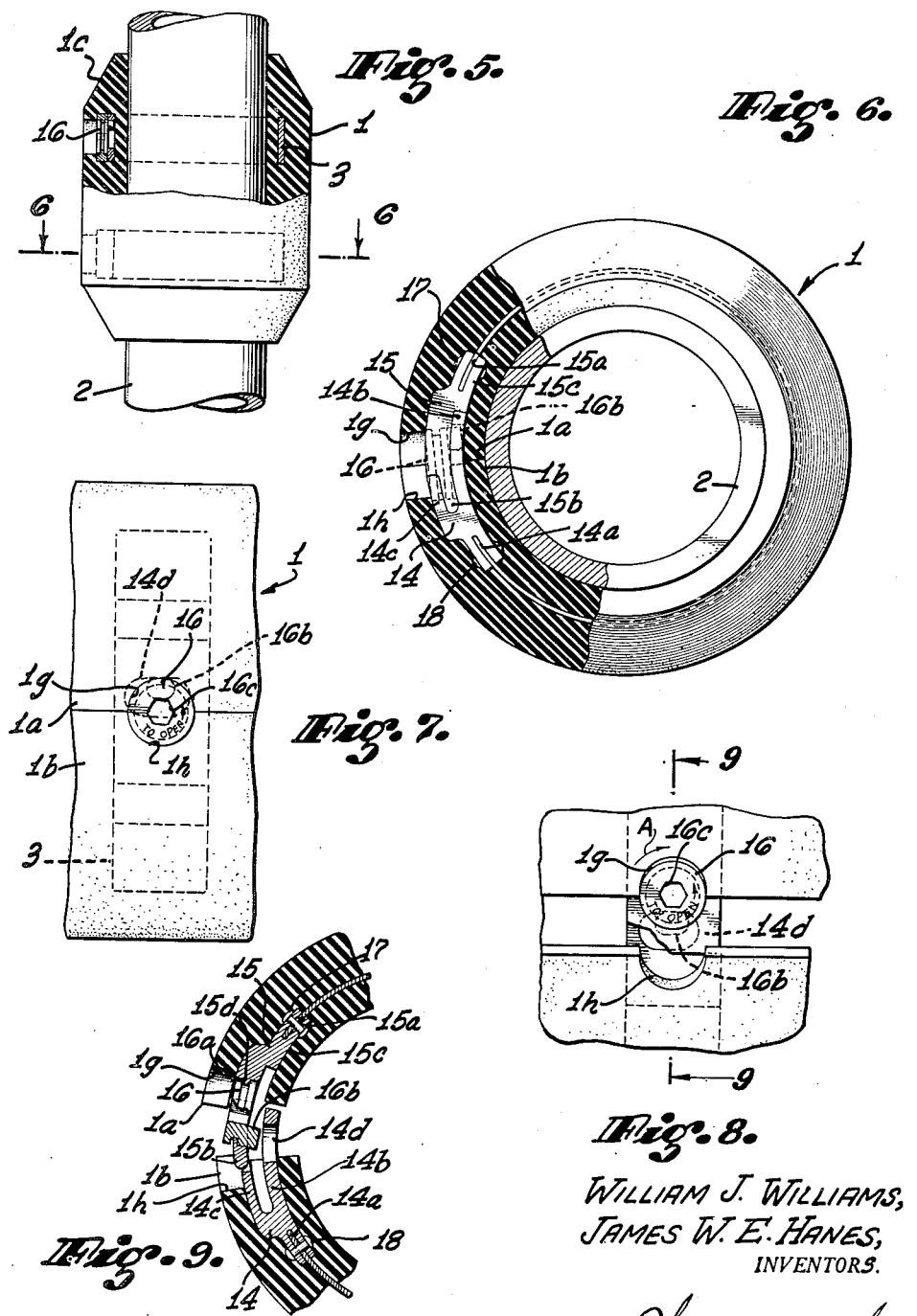

UNITED STATES PATENT OFFICE 2,628,134

PROTECTIVE COLLAR FOR DRILL PIPES

William J. Williams and James W. E. Hanes, Ventura, Calif., assignors to Ventura Tool Company, Ventura, Calif., a corporation of California Application July 17, 1948, Serial No. 39,294

20 Claims. (Cl. 308—4)

Our invention relates to a collar for drill pipes, particularly to a split protective collar of this class made from rubber, or similar resilient material.

One of the principal objects of this invention is to provide a protective collar for drill pipes which may be readily placed around any portion between the ends of a drill pipe, and which, when placed around the pipe, may be easily drawn around the drill pipe and tightly locked in the desired position therearound.

Another important object of this invention is to provide novel and simple means for drawing and locking together the split portions of a yieldable protective collar for drill pipes, and means of this class which may be easily and quickly operated by one person, either when securing the collar in position or when removing the same from the drill pipe.

An important object also of this invention is to provide a protective collar of this class in which all of the mechanically operating parts are protected within the collar itself, so that the split collar will not separate of itself nor injure other portions against which the collar may come into contact.

A further important object of this invention is to provide a strap take-up or locking means for a protective collar of this class whereby the metallic band will be substantially only diametrically expanded and contracted and the ends directly drawn together when fastening the collar around a pipe, and whereby the ends are positively locked together against displacement in any direction.

A still further important object of this invention is to provide a collar take-up or locking means which is drawn together and locked by means of a key, which cannot be readily operated or opened without such key.

With these and other objects in view, as will appear hereinafter, we have devised a protective collar for drill pipes having certain novel features of construction, combination, and arrangement of parts and portions, as will be hereinafter described in detail, and particularly set forth in the appended claims, reference being had to the accompanying drawings and to the characters of reference thereon, which form a part of this application, in which:

Fig. 5 is a side elevational view, similar to Fig. 1, of our protective collar in a slightly modified form;

Fig. 6 is an enlarged transverse sectional view thereof, partly in section, with the sectional portion taken through 6—6 of Fig. 5, showing particularly the tightening and locking means of the alternate or modified protective collar;

Fig. 7 is an enlarged fragmentary side view, showing the tightening and locking means when the collar of Fig. 5 is secured in position;

Fig. 8 is a similar fragmentary side view thereof, with the ends of the collar member and band in an open or separated condition to facilitate the removal of the collar from the pipe; and Fig. 9 is a fragmentary sectional view, taken through 9—9 of Fig. 8.

Figure 1:
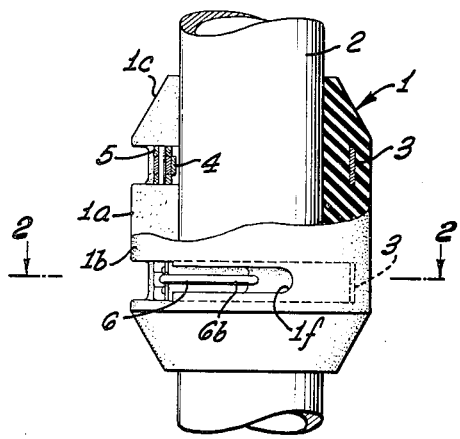
Fig. 1 is a side elevational view of our protective collar in one form, showing the same mounted around a pipe, and showing portions of the collar broken away and in section to facilitate the illustration.

The principal protective collar member, designated 1 in the drawings, is generally similar to those in common use. It is made of rubber, cylindrical in shape as a hollow sleeve, and split longitudinally at one side forming split portions 1a and 1b which are adapted to be abutted when the collar is closed around a drill pipe 2, or other member. The opposite end portions of the collar are chamfered, as indicated by 1c, to facilitate their longitudinal movement within the well casing.

Within the rubber collar we have provided a plurality of flexible or resilient metal bands 3 which extend circumferentially therein and are split, with the ends thereof near the split portions of the collar. As shown, two of such metallic bands are provided, and these are identical and spaced longitudinally from each other and near the ends of the collar so as to draw both end portions of the collar tightly around the drill pipe.

Figure 2:
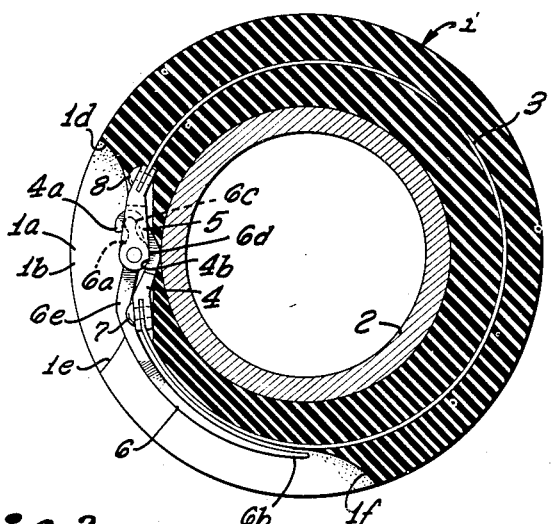
Fig. 2 is an enlarged transverse sectional view thereof, taken through 2—2 of Fig. 1.
Figure 3:
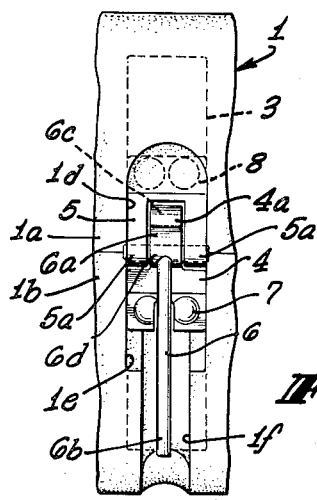
Fig. 3 is an enlarged side view of a portion of the collar, showing particularly the means for detachably connecting the ends of the split metallic band.
Figure 4:
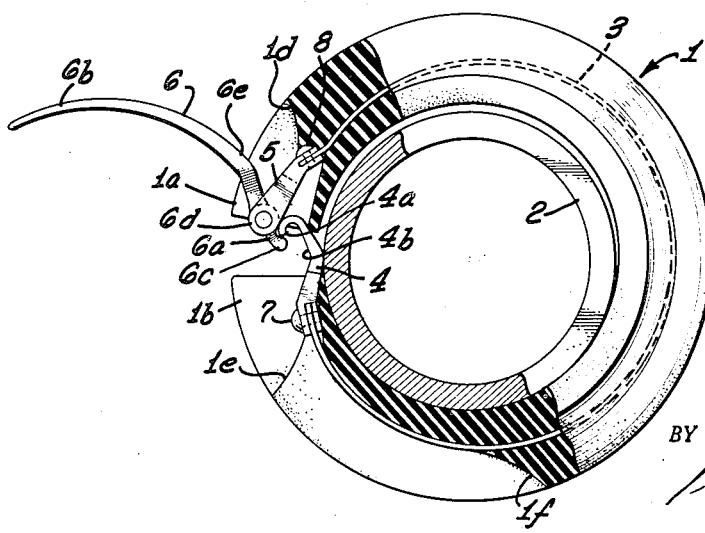
Fig. 4 is an enlarged fragmentary view, similar to that of Fig. 2, but showing the connecting means for the split collar and band in open or unlocked position for removing the collar, or preparatory to securing the collar in the pipe-embracing position.

The means, shown in the structure illustrated in Figs. 1 to 4, for drawing the collar tightly around the drill pipe and locking the same therearound with the split portions of the collar tightly abutted, comprise primarily three elements, namely, a pair of fittings consisting of a hook 4, a hinge member 5, and a cam lever 6 pivotally mounted on the hinge member. The hook 4 and the hinge member 5 are secured by rivets 7 and 8, respectively, to the ends of the band 3, and when the collar is secured in position around the pipe, these fittings overlap each other, as shown in Figs. 2 and 3. The portion of the fitting 4 secured to the band 3 is preferably the width of the band, but the hook portion $4^a$ is relatively narrow. The hinge member 5 is bifurcated at its end, having furcations $5^a$, and receives therebetween the narrow hook portion. The cam lever 6 consists of two arms, namely, a short cam arm $6^a$ and a long lever arm $6^b$. The cam arm has a cylindrical portion $6^c$ at its end which is adapted to fit into the hook portion $4^a$, as indicated in Figs. 2 and 4. When the cam lever is open, the cam arm $6^a$ is positioned at the outer side of the hook portion, but when the collar is closed around the pipe, the cylindrical portion $6^a$ is adapted to roll into the hook portion, permitting the band to be drawn tightly by causing the hook portion to be drawn beyond the pivotal axis of the cam lever 6. When drawn tightly in this manner the hook portion is located between the furcations of the hinge member 5, as shown in Figs. 2 and 3. The hook member is so shaped that the pivotal portion $6^d$ of the lever 6 fits into a depression $4^b$ of the fitting 4 when the collar is closed tightly around the pipe. The lever arm $6^b$ also has a bent portion $6^e$ whereby a lever arm may extend outwardly from its pivotal portion $6^d$ and then conform with the contour of the round band 3 outwardly from the end to which the fitting 4 is connected.

It will be here noted that the portions of the collar adjacent the split portions $1^a$ and $1^b$, and opposite the fittings 4 and 5, are provided with recesses $1^d$ and $1^e$ so that the fittings are readily accessible. The collar is further provided with an arcuate recess $1^f$ into which the handle portion of the lever arm $6^b$ may be received when the drill protective collar is secured around a pipe.

The alternate or modified means for drawing the collar tightly around the drill pipe and locking the same therearound with the split portions of the collar tightly abutted, as shown in Figs. 5 to 9, comprise a pair of fittings 14 and 15, each secured to an end portion of the band 3, and a cam member 16 mounted in the fitting 15.

The fittings 14 and 15 are substantially of the width of the band 3, and secured thereto by inserting the ends of the band into arcuate slots $14^a$ and $15^a$ at the remote or inner ends of the fittings. The end portions of the band are secured in such positions to the fittings by rivets 17 and 18.

The free or extended ends of the fittings 14 and 15 are adapted to interlock with each other to prevent transverse movement with respect to each other, that is, inwardly and outwardly with respect to the axis of the collar member. For this purpose the fitting 14 is provided with a pair of spaced arcuate flanges $14^b$ and $14^c$, the former being positioned radially inwardly from the latter and extended circumferentially beyond the end of the latter. The fitting 15 has a tongue $15^b$ which is offset outwardly, with respect to the axis of the collar member, beyond the inner face $15^c$ of the fitting, as shown in Fig. 9. This construction permits the tongue $15^b$ to enter the space between the flanges $14^b$ and $14^c$, and the flange $14^b$ to enter the space against the inner side of the tongue $15^b$, as shown best in Fig. 6.

In the portion of the flange $14^b$, which extends beyond the end of the flange $14^c$, is a cam opening $14^d$ which extends transversely with respect to the band, as shown in Figs. 7 and 8, and this opening is preferably in the form of an oblong and is located nearer one edge of the fitting 14, namely, offset relative to or positioned to the left of the axis thereof, as shown in Figs. 7 and 8.

In the tongue $15^b$ is pivotally or rotatably mounted the locking member 16 which may also be referred to as a cam member. This member is in the form of a disc. The axis of rotation of the locking member or disc is preferably normal to the band and transverse with respect to the axis of the collar member. The locking member is keyed within the tongue $15^b$ by providing an annular groove $16^a$ therein, and providing an annular ring $15^d$ in the fitting 15, which ring extends into the groove $16^a$. Beyond the inner side of the locking member or disc 16 extends the cam portion or cam jaw $16^b$. This cam jaw is positioned at one side of the axis of rotation of the locking member or disc 16, and is also in the form of an oblong with the longitudinal dimension thereof extending circumferentially with respect to the member 16.

This construction of the cam jaw $16^b$ permits the same to be readily inserted into the cam slot or opening $14^d$ from the outer side against the side of the cam slot or opening outermost with respect to the circumferential extent of the band. When the tongue $15^b$ is forced into engagement with the outer side of the flange $14^b$ and the locking member 16 is rotated in the direction of the arrow, designated A, the cam jaw is shifted to the side of the axis of the member 16 diametrically opposite to the initial position of the cam jaw. This causes the two ends of the band to be drawn together with the fittings 14 and 15 in interlocking relation, as shown in Figs. 6 and 7.

The offset position of the cam slot or opening permits the cam jaw $16^b$ to be freely rotated within the opening $14^d$ when rotated by the locking member to the locked position. This requires a clockwise rotation of the locking member when closing the lock, the clockwise rotation being limited, when locking is effected, by engagement of the cam jaw with the short end of the cam slot or opening.

To facilitate the rotation of the locking member 16, we have provided a polygonally-shaped recess $16^c$ at the outer side thereof, this recess being substantially in the form to receive an Allenhead wrench.

This construction requires only slight semicircular recesses $1^g$ and $1^h$ at the abutting edge portions of the collar member to provide access to the outer side of the locking member 16, as shown in Figs. 6 and 7.

We wish it to be understood that we do not desire to be limited to the exact details of construction shown and described, for obvious modifications will occur to a person skilled in the art.

We claim:

1. A protective collar of the class described, including a cylindrical collar member of yieldable material split substantially longitudinally at one side, a split flexible metallic band extending circumferentially thereof, one end of the band having a hook extending beyond the coincident split portion of the collar and directed outwardly and toward said split portion, and a cam lever pivotally mounted near one end on the opposite end of the band on an axis parallel to the axis of the collar, the end of the short arm of the lever, when the band is tightened, being positioned in the hook, and the long arm of the lever being positioned against the outer side of the end portion of the band having the hook, said hook and lever lying completely inwardly of the outer wall of the collar member when said band is tightened.

2. A protective collar of the class described, including a cylindrical collar member of yieldable material split substantially longitudinally at one side, a split flexible metallic band molded circumferentially therein, one end of the band having a hook extending beyond the coincident split portion of the collar and directed outwardly and toward said split portion, and a cam lever pivotally mounted near one end on the opposite end of the band on an axis parallel to the axis of the collar, the end of the short arm of the lever, when the band is tightened, being positioned in the hook, and the long arm of the lever being positioned against the outer side of the end portion of the band having the hook, the outer sides of the collar at the split portion having openings to expose the hook and the lever, said collar having an arcuate opening beyond the band at the hook end thereof for receiving the long arm of the lever when the protective collar is closed around a pipe, said hook and lever lying completely inwardly of the outer wall of the collar member when the protective collar is closed around the pipe.

3. A protective collar of the class described, including a cylindrical collar member of yieldable material split substantially longitudinally at one side, a split flexible metallic band extending circumferentially thereof, one end of the band having a cam opening, and a take-up member rotatably mounted in the other end portion of the band on an axis transverse to the axis of the collar, said take-up member having at its inner end a cam jaw adapted to be inserted into the opening, the rotation of the take-up member causing said cam jaw to be shifted with respect to the axis of the take-up member for drawing the end portions of the band relative to each other, the axial portion of the cam member having a polygonally-shaped recess for receiving a cam-member-rotating wrench.

4. A protective collar of the class described, including a cylindrical collar member of yieldable material split substantially longitudinally at one side, a split flexible metallic band extending circumferentially thereof, take-up means comprising interlocking fittings, one secured to each end portion of the band, one fitting having radially inner and outer flanges, the inner flange having a cam opening positioned beyond the end of the outer flange, the other fitting having a tongue adapted to fit between the inner and outer flanges of the first fitting, and a cam member rotatably mounted in said other fitting and provided with a cam jaw extending inwardly and adapted to be inserted into the opening of the inner flange, said cam jaw, when insertable into said opening, being positioned at one side of the rotatable axis of the cam member and adapted to be shifted to the diametrically opposite position about the axis of the cam member with respect to the longitudinal axis of the band, and the end of the other fitting being adapted to be positioned between the flanges of the first fitting, when the cam member is rotated about its axis, the innermost position of the cam jaw with respect to the split end of the band on which the cam member is mounted resulting in engagement of the cam jaw with the outermost edge portion of the opening in the other split end of the band for drawing the end portions of the band together, the axial portion of the cam member having a polygonally-shaped recess for receiving a cam-member-rotating wrench.

5. In a drill pipe protector: an annular collar member of pliant, elastic material split substantially longitudinally at one side thereof; a split flexible band embedded in said member between its inner and outer walls and extending circumferentially therearound; and means secured to said band on opposite sides of said member and band splits and including coengageable elements movable with respect to each other to draw the ends of said band and member circumferentially toward each other to contract said band and member, said means lying completely inwardly of the outer wall of said member upon contraction of said band and member.

6. In a drill pipe protector: an annular collar member of pliant, elastic material split substantially longitudinally at one side thereof; a split flexible band embedded in said member between its inner and outer walls and extending circumferentially therearound; and means secured to said band on opposite sides of said member and band splits and including coengageable elements movable with respect to each other to draw the ends of said band and member circumferentially toward each other to contract said band and member, said means lying inwardly of the outer wall of said member upon contraction of said band and member; said annular collar member including portions on opposite sides of the member split in substantial abutting relation to each other when said band and member have been contracted by said means.

7. In a drill pipe protector: an annular collar member of pliant, elastic material split substantially longitudinally at one side thereof; a split flexible band embedded in said member between its inner and outer walls and extending circumferentially therearound; and means secured to said band on opposite sides of said member and band splits and including coengageable elements movable with respect to each other to draw the ends of said band and member circumferentially toward each other to contract said band and member, said means lying inwardly of the outer wall of said member upon contraction of said band and member; said annular collar member including portions on opposite sides of the member split and disposed above and below said means, which portions substantially abut each other when said band and member have been contracted by said means, to provide a substantially continuous outer wall surface around the entire circumference of said member.

8. In a drill pipe protector: an annular collar member of pliant, elastic material split substantially longitudinally at one side thereof; a split flexible band embedded in said member between its inner and outer walls and extending circumferentially therearound; and means secured to said band on opposite sides of the band and member splits and including a cam member pivotally mounted on one end portion of said band and engageable with another end portion of said band to contract said band and annular member upon rotation of said cam member on said one end portion, said means lying completely inwardly of the outer wall of said annular member upon contraction of said band and annular member.

9. In a drill pipe protector: an annular collar member of pliant, elastic material split substantially longitudinally at one side thereof; a plurality of split flexible bands longitudinally separated from each other and embedded in said member between its inner and outer walls and extending circumferentially therearound; means secured to said bands on opposite sides of said member and band splits and including coengaging elements movable with respect to each other to draw the ends of said bands and member circumferentially toward each other to contract said bands and member, said means lying completely inwardly of the outer wall of said member upon contraction of said bands and member; said annular collar member including portions on opposite sides of the member split and disposed above and below each band, which portions substantially abut each other when said bands and member have been contracted by said means, to provide substantially continuous outer wall surfaces around the entire circumference of said collar member.

10. In a drill pipe protector: an annular collar member of pliant, elastic material split substantially longitudinally at one side thereof; a split flexible band embedded in said member between its inner and outer walls and extending circumferentially therearound; and means secured to said band on opposite sides of said member and band splits and including coengageable elements movable with respect to each other to draw the ends of said band and member circumferentially toward each other to contract said band and member, said means lying completely inwardly of the outer wall of said member upon contraction of said band and member; said annular collar member including portions on opposite sides of the member split and disposed above and below said means, which portions substantially abut each other when said band and member have been contracted by said means, to provide substantially continuous inner and outer wall surfaces around the entire circumference of said collar member.

11. In a drill pipe protector: an annular collar member of pliant, elastic material split substantially longitudinally at one side thereof; a split flexible band embedded in said member between its inner and outer walls and extending circumferentially therearound; and an eccentric member rotatable on an end portion of said band at one side of its split and movable laterally of the axis of said band into and out of an opening in said band at the opposite side of its split, said eccentric member being rotatable when in said opening to engage the band at said opposite side of the band split to contract said band and collar member.

12. In a drill pipe protector: an annular collar member of pliant, elastic material split substantially longitudinally at one side thereof; a split flexible band embedded in said member between its inner and outer walls and extending circumferentially therearound; and an eccentric member rotatable on an end portion of said band at one side of its split and movable laterally of the axis of said band into and out of an opening in said band at the opposite side of its split, said eccentric member being rotatable when in said opening to engage the band at said opposite side of the band split to contract said band and collar member; said eccentric member lying completely inwardly of the outer wall of said annular member upon contraction of said band and member.

13. In a drill pipe protector: an annular collar member of pliant, elastic material split substantially longitudinally at one side thereof; a split flexible band embedded in said member between its inner and outer walls and extending circumferentially therearound; and an eccentric member rotatable on an end portion of said band at one side of its split and movable laterally of the axis of said band into and out of an opening in said band at the opposite side of its split, said eccentric member being rotatable when in said opening to engage the band at said opposite side of the band split to contract said band and collar member; said eccentric member lying inwardly of the outer wall of said annular member upon contraction of said band and collar member; said annular collar member including portions on opposite sides of the collar member split which substantially abut each other when said band and collar member have been contracted by said eccentric member to provide a substantially continuous outer wall surface around the entire circumference of said annular member.

14. In a drill pipe protector: an annular collar member of pliant, elastic material split substantially longitudinally at one side thereof; a split flexible band embedded in said member between its inner and outer walls and extending circumferentially therearound; an eccentric member rotatable on said band about an axis transverse to the axis of said collar member and movable laterally of the surface of said collar member into and out of an opening in said band, said eccentric member being rotatable when in said opening to engage the band to contract said band and annular collar member; said eccentric member lying completely inwardly of the outer wall of said annular member upon contraction of said band and collar member.

15. In a drill pipe protector: an annular collar member of pliant, elastic material split substantially longitudinally at one side thereof; a split flexible band embedded in said member between its inner and outer walls and extending circumferentially therearound; an eccentric member rotatable on an end portion of said band at one side of its split and movable laterally of the axis of said band into and out of an opening in said band at the opposite side of its split, said eccentric member being rotatable when in said opening to engage the band at said opposite side of the band split to contract said band and collar member; and a tongue on said band at one side of its split fitting within a groove in said band at the opposite side of its split for retaining said eccentric member in said opening when said band and collar member have been contracted.

16. A protective collar of the class described, including a cylindrical collar member of yieldable material split substantially longitudinally at one side, a split flexible metallic band extending circumferentially thereof, one end of the band having a cam opening, and a take-up member rotatably mounted in the other end portion of the band on an axis transverse to the axis of the collar member, said take-up member having at its inner end a cam jaw adapted to be inserted into the opening, the rotation of the take-up member causing said cam jaw to be shifted with respect to the axis of the take-up member for drawing the end portions of the band relative to each other, the axial portion of the cam member having a non-circular recess for receiving a tool for rotating the cam member.

17. A protective collar of the class described, including a cylindrical collar member of yieldable material split substantially longitudinally at one side, a split flexible metallic band extending circumferentially thereof, take-up means comprising interlocking fittings, one secured to each end portion of the band, one fitting having radially inner and outer flanges, the inner flange having a cam opening positioned beyond the end of the outer flange, the other fitting having a tongue adapted to fit between the inner and outer flanges of the first fitting, and a cam member rotatably mounted in said other fitting and provided with a cam jaw extending inwardly and adapted to be inserted into the opening of the inner flange, said cam jaw, when insertable into said opening, being positioned at one side of the rotatable axis of the cam member and adapted to be shifted to the diametrically opposite position about the axis of the cam member with respect to the longitudinal axis of the band, and the end of the other fitting being adapted to be positioned between the flanges of the first fitting, when the cam member is rotated about its axis, the innermost position of the cam jaw with respect to the split end of the band on which the cam member is mounted resulting in engagement of the cam jaw with the outermost edge portion of the opening in the other split end of the band for drawing the end portions of the band together, the axial portion of the cam member having a non-circular recess for receiving a tool for rotating the cam member.

18. In a drill pipe protector: an annular wall member of pliant, elastic material split substantially longitudinally at one side thereof; a split flexible band embedded in said member between its inner and outer walls and extending circumferentially therearound; means providing a hook on one end of the band; a cam lever pivotally mounted on the opposite end of the band on an axis substantially parallel to the axis of the collar member; said lever having one arm positionable in the hook and another arm movable inwardly toward the axis of the collar member to draw the ends of said band and collar member circumferentially toward each other to contract said band and collar member, said hook and lever lying completely inwardly of the outer wall of the collar member upon contraction of said band and collar member.

19. In a drill pipe protector: an annular wall member of pliant, elastic material split substantially longitudinally at one side thereof; a split flexible band embedded in said member between its inner and outer walls and extending circumferentially therearound; means providing a hook on one end of the band; a cam lever pivotally mounted on the opposite end of the band on an axis substantially parallel to the axis of the collar member; said lever having one arm positionable in the hook and another arm movable inwardly toward the axis of the collar member to draw the ends of said band and collar member circumferentially toward each other to contract said band and collar member, said hook and lever lying completely inwardly of the outer wall of the collar member upon contraction of said band and collar member; said annular collar member including portions on opposite sides of the collar member split in substantial abutting relation to each other when said band and collar member have been contracted by said lever and hook to provide a substantially continuous outer wall surface around the entire circumference of said collar member.

20. In a drill pipe protector: an annular wall member of pliant, elastic material split substantially longitudinally at one side thereof; a split flexible band embedded in said member between its inner and outer walls and extending circumferentially therearound; means providing a hook on one end of the band; a cam lever pivotally mounted on the opposite end of the band on an axis substantially parallel to the axis of the collar member; said lever having one arm positionable in the hook and another arm movable inwardly toward the axis of the collar member to draw the ends of said band and collar member circumferentially toward each other to contract said band and collar member, said hook and lever lying completely inwardly of the outer wall of the collar member upon contraction of said band and collar member; said annular collar member including portions on opposite sides of the member split in substantial abutting relation to each other when said band and collar member have been contracted by said lever and hook to provide substantially continuous inner and outer wall surfaces around the entire circumference of said collar member.

WILLIAM J. WILLIAMS.
JAMES W. E. HANES.

REFERENCES CITED

The following references are of record in the file of this patent:

UNITED STATES PATENTS

| Number | Name | Date |
|---|---|---|
| 1,030,073 | Gibbs | June 18, 1912 |
| 1,220,987 | Henry | Mar. 27, 1917 |
| 1,784,516 | Fairbanks | Dec. 9, 1930 |
| 1,994,819 | Hartson | Mar. 19, 1935 |
| 2,091,916 | Evans | Aug. 31, 1937 |
| 2,313,459 | Van Horn | Mar. 9, 1943 |